No. 12,466.

REISSUED MAR. 27, 1906.

C. BILADEAU & A. P. CHAPDELAINE.

MACHINE FOR POLISHING BOOTS OR SHOES.

APPLICATION FILED JUNE 18, 1904.

2 SHEETS—SHEET 1.

WITNESSES

Elizabeth C. Coupe.

Arthur L. Russell.

INVENTORS.

Calice Biladeau

Adelard P. Chapdelaine

By their Attorney,

Nelson W. Morand

No. 12,466. REISSUED MAR. 27, 1906.

C. BILADEAU & A. P. CHAPDELAINE.

MACHINE FOR POLISHING BOOTS OR SHOES.

APPLICATION FILED JUNE 18, 1904.

2 SHEETS—SHEET 2.

WITNESSES.

Elizabeth C. Coufee

Arthur L. Russell

INVENTORS.

Calixe Biladeau

Adelard P. Chapdelaine

By Their Attorney,

Nelson Morrand

UNITED STATES PATENT OFFICE.

CALICE BILADEAU, OF WEST BRIDGEWATER, AND ADELARD P. CHAPDELAINE, OF BROCKTON, MASSACHUSETTS, ASSIGNORS TO UNITED-XPEDITE FINISHING COMPANY, OF BERWICK, MAINE, AND BOSTON, MASSACHUSETTS, A CORPORATION OF MAINE.

MACHINE FOR POLISHING BOOTS OR SHOES.

No. 12,466. Specification of Reissued Letters Patent. Reissued Mar. 27, 1906.

Original No. 738,976, dated September 15, 1903. Application for reissue filed June 18, 1904. Serial No. 213,181.

*To all whom it may concern:*

Be it known that we, CALICE BILADEAU, residing at West Bridgewater, and ADELARD P. CHAPDELAINE, residing at Brockton, in the county of Plymouth and Commonwealth of Massachusetts, citizens of the United States, have invented new and useful Improvements in Machines for Polishing Boots or Shoes, of which the following is a specification.

This invention relates to improvements in machines for polishing boots and shoes; and it has for its object to provide a machine of novel construction and mode of operation for the efficient performance of this work.

The invention comprises the several novel features, including certain details of construction and arrangements of parts and mode of operation, hereinafter set forth and claimed, reference being had to the accompanying drawings, in which—

Figure 1:
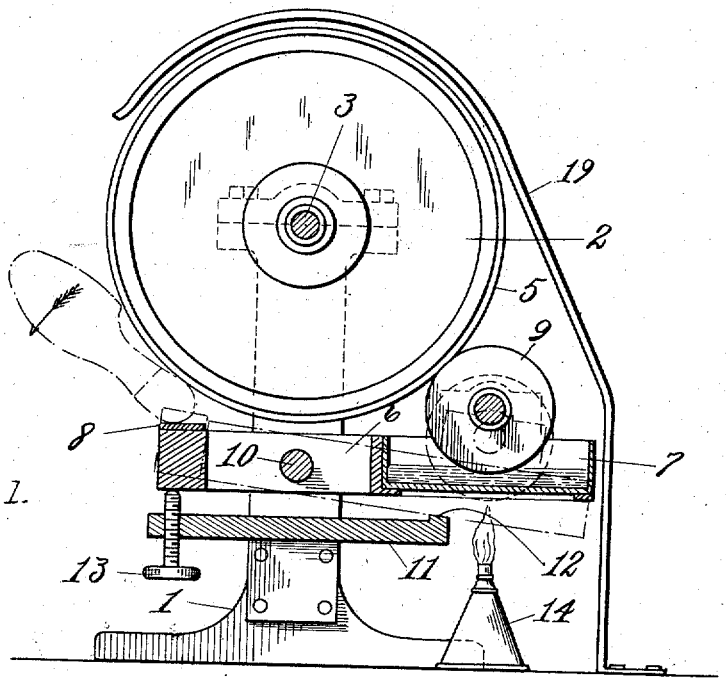
Figure 2:
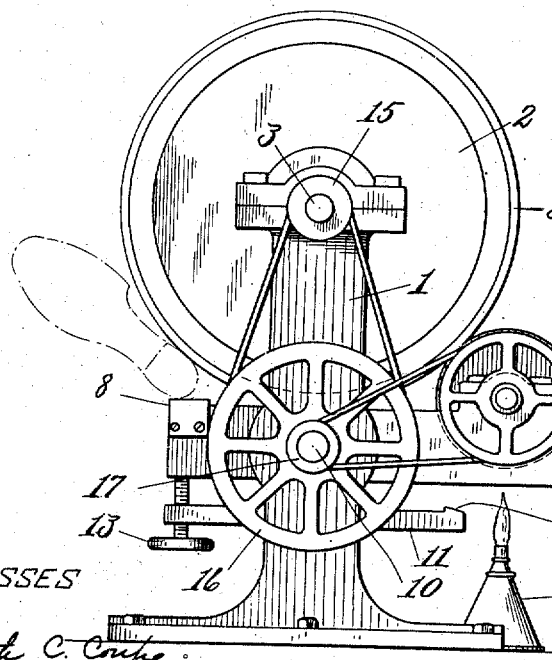
Figure 3:
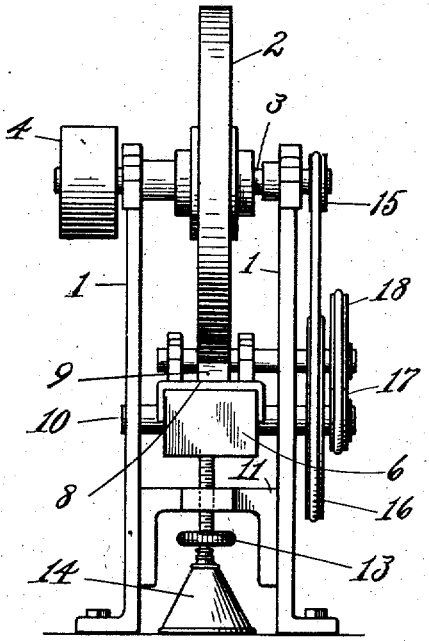
Figure 4:
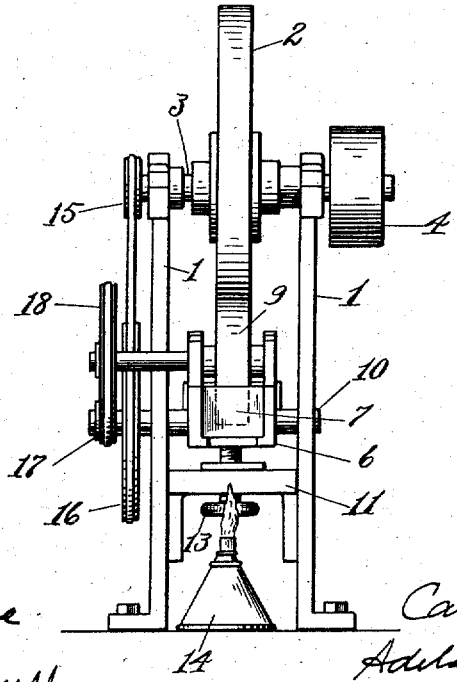

Figure 1 is a sectional view illustrating the position of the shoe and the several parts of the machine when one side of the heel is being polished. Fig. 2 is an end view. Fig. 3 is a front view, and Fig. 4 a rear view, of the machine.

In said drawings, in which is illustrated an efficient and the best known form of construction and arrangement of parts embodying our invention, the reference-numeral 1 designates standards by which the other elements of the machine are supported.

The numeral 2 designates the polishing-wheel, carried by a rotatable shaft 3, mounted in suitable bearings in the standards and receiving its motion from a suitable source of power by means of a band-pulley 4. The surface of this polishing-wheel is of suitable contour and is provided with a suitable facing 5, such as fabric, for receiving the polishing-wax and applying the same to the part of the boot or shoe which is to be polished. Supported by the standards 1, in coöperative relation to the polishing-wheel 2, is a frame 6, provided at one end with a wax-well 7 and at the other end with the boot or shoe rest 8. Mounted to rotate in suitable bearings in this frame is a wax-supply roll 9, that works in the wax in the well 7 and operates to transfer or supply wax to the polishing-wheel 2. The boot or shoe rest 8 is provided with a suitable cushion, of leather, felt, or the like, so as to avoid any abrasion of or injury to a boot or shoe placed thereon in the polishing operation. The frame 6 is a tilting or oscillating one, being pivoted to the standards 1, as shown at 10. A gage 11 is arranged beneath the frame 6 and is provided with a stop 12 at one end to limit the tilting or oscillation of the frame in one direction, and an adjustable stop 13, shown in the form of a screw, is arranged at the other end to limit the oscillation or tilting of the frame in the other direction. A suitable heating device 14, which in the present example of the invention illustrated is a lamp, is arranged beneath the wax-well and serves to melt and maintain in a melted or liquefied condition the wax within the well. When at rest, the position of the frame 6 is shown in dotted lines in Fig. 1 of the drawings, the wax-supply roll being out of contact with the polishing-wheel 2, and the arrangement is such that the preponderance of weight of the frame 6 is on the wax-well side of the pivot 10, so that the frame normally and automatically assumes said dotted-line position for rendering the wax-supplying means inoperative for delivering wax to the polishing-wheel when the boot or shoe is removed from the shoe-rest and is moved into the full-line position shown in Fig. 1 for rendering the wax-supplying means operative for delivering wax to the polishing-wheel when the heel of a boot or shoe is pressed upon the shoe-rest.

In operation, the wax in the well having been melted or liquefied by the heating device, a shoe is placed upon the shoe-rest—for example, in the manner illustrated in dotted lines in Fig. 1, where the operation of polishing a shoe-heel is illustrated. In the act of doing this the tilting or oscillating frame is moved to bring the wax-roll into contact with the polishing-wheel 2, whereby the melted or liquefied wax is supplied to said polishing-wheel. The operator then while pressing the heel against the polishing-wheel turns the shoe so as to present one side and a portion of the back of the heel to the polishing-wheel, whereby the wax thereon is applied to the surface of the heel and a high polish is produced on said surface by the friction of the wheel. Thereafter the shoe is reversed, and the other side and the remainder of the back of the heel are similarly treated.

The stop 13 may be adjusted to different degrees to accommodate different work to be done by the machine. This stop 13 may also be adjusted to such position that when a boot or shoe is placed in position to be polished the wax-supply roll will not come in contact with the polishing-wheel. This will perhaps be frequently desirable, as the polishing-wheel may take up sufficient wax to polish a number of boots or shoes, in which case of course it will not be desired that the wax-supply roll shall supply further wax to the wheel, and in such cases the stop will be so adjusted that when the shoe is introduced the supply-roll will not come into contact with or feed wax to the polishing-wheel.

In practice it has been found that the machine described is very efficient in its operation.

A suitable means of driving the wax-supply roll from the shaft of the polishing-wheel is illustrated in the drawings and consists of a belt trained about a pulley 15 on the shaft 3 of the polishing-wheel and a relatively large pulley 16 on the main shaft, which also carries the relatively small pulley 17, belted to the relatively large pulley 18 on the shaft of the wax-supply roll, whereby a suitable relative speed of rotation of the wax-supply roll as compared with that of the polishing-wheel is attained.

The invention is not restricted to the particular construction and arrangement of parts herein described, as modifications thereof may readily suggest themselves to skilled mechanics, and therefore it is to be understood that the invention is not limited to such details, but resides in the combination, arrangement, and mode of operation set forth in the following clauses of the claim.

Preferably a shield 19 to prevent splashing of the wax is provided, as shown in the drawings.

Having thus described our invention, what we claim as new is—

1. In a machine for polishing boots and shoes, the combination with a polishing-wheel, and a frame provided with a wax-well, of a wax-supply roll, a shoe-rest, and a heating device for melting or liquefying the wax.

2. In a machine for polishing boots and shoes, the combination with a polishing-wheel, of a tilting frame provided with a wax-well, a wax-supply roll and a shoe-rest.

3. In a machine for polishing boots and shoes, the combination with a polishing-wheel, and a tilting frame provided with a wax-well, of a wax-supply roll, a shoe-rest, and a gage having stops to limit the tilting of the frame.

4. In a machine for polishing boots and shoes, the combination with a polishing-wheel, and a tilting frame provided with a wax-well, of a wax-supply roll, a shoe-rest, and a heating device for melting or liquefying the wax.

5. In a machine for polishing boots and shoes, the combination with a polishing-wheel, and a tilting frame provided with a wax-well, of a wax-supply roll, a shoe-rest, a gage having stops to limit the tilting of the frame, and a heating device for melting or liquefying the wax.

6. In a machine for polishing boots and shoes, the combination with a polishing-wheel, and a tilting frame provided with a wax-well, of a wax-supply roll, a shoe-rest, and an adjustable stop for said frame.

7. In a machine of the class described, the combination with a polishing-wheel, of a movable shoe-rest to support the heel of a shoe in position to be polished, and wax-supplying means constructed and arranged with relation to the shoe-rest whereby movement of the shoe-rest may render said supplying means operative for supplying wax to the polishing-wheel.

8. In a machine of the class described, the combination with a polishing-wheel, of a rest adapted to support a shoe in position to be polished, wax-supplying means normally inoperative for supplying wax to the polishing-wheel, and connections between the rest and the wax-supplying means for rendering the wax-supplying means operative for supplying wax to the polishing-wheel when a shoe is supported on the shoe-rest.

9. In a machine of the class described, the combination with a polishing-wheel, of wax-supplying means, and means constructed and arranged to be engaged by the shoe being operated upon whereby wax is caused to be supplied to the polishing-wheel.

10. In a machine for finishing heels, the combination with a rotary polishing-wheel, a movable rest to engage one part of the edge of the heel while another part of the heel edge is being operated upon by the polishing-wheel, and means for supplying wax to the periphery of the polishing-wheel, of connections between said rest and the wax-supplying means whereby the wax-supplying means is rendered operative for supplying wax to the polishing-wheel when the rest is moved.

In testimony whereof we have signed our names to the specification in the presence of two subscribing witnesses.

CALICE BILADEAU.
ADELARD P. CHAPDELAINE.

Witnesses:
ARTHUR L. RUSSELL,
WELLS L. CHURCH.